United States Patent [19]
Butt

[11] 4,099,559
[45] Jul. 11, 1978

[54] SOLAR ABSORBER PLATE DESIGN

[75] Inventor: Sheldon H. Butt, Godfrey, Ill.

[73] Assignee: Olin Corporation, New Haven, Conn.

[21] Appl. No.: 685,061

[22] Filed: May 10, 1976

[51] Int. Cl.² ............ F28F 3/14; F28F 9/22; F24J 3/02
[52] U.S. Cl. .................... 165/170; 126/271; 165/174
[58] Field of Search .......... 165/170, 174; 62/523; 29/157.3 V; 126/271; 237/1 A

[56] References Cited

U.S. PATENT DOCUMENTS

| | | | |
|---|---|---|---|
| 1,994,903 | 3/1935 | Warrender | 29/157.3 V |
| 2,448,648 | 9/1948 | Zideck | 165/170 |
| 2,626,130 | 1/1953 | Raskin | 62/523 |
| 2,662,273 | 12/1953 | Long | 165/170 |
| 2,705,948 | 4/1955 | Rostock | 126/271 |
| 2,830,800 | 4/1958 | Gerhardt | 165/170 |
| 2,857,660 | 10/1958 | Staples | 29/157.3 V |
| 2,900,175 | 8/1959 | McGuffey | 165/170 |
| 3,003,228 | 10/1961 | Thomas | 29/157.3 V |
| 3,502,142 | 3/1970 | McGuffey | 165/170 |
| 4,027,821 | 6/1977 | Hayes et al. | 237/1 A |

Primary Examiner—Charles J. Myhre
Assistant Examiner—Sheldon Richter
Attorney, Agent, or Firm—Paul Weinstein; Robert A. Dawson

[57] ABSTRACT

A heat exchange panel possessing a system of internal fluid passageways defining at least two longitdudinally extended headers extending substantially the length of the panel, a connecting header located at one end of the panel in a direction transverse to the longitudinally extended headers and interconnecting same, a plurality of connecting portions of said passageways extending transversely between the respective longitudinally extended headers, and fluid exit and entry portions extending longitudinally from at least two of said headers. The configuration of the headers serves to reduce pressure drop while maintaining uniformity of fluid flow under high velocity, and renders the panel eminently suitable for solar energy applications.

18 Claims, 11 Drawing Figures

SOLAR ABSORBER PLATE DESIGN

BACKGROUND OF THE INVENTION

The present invention relates to metal panels having a system of internal tubular passageways disposed between spaced apart portions of the thickness of the panel. Said panels possess utility in heat exchange applications wherein a heat exchange medium is circulated through said passageways. A particular application of said panels resides in devices utilizing solar energy, and specifically, solar energy absorbing devices for elevating fluid temperature.

It is well known that the radiation of the sun can be collected as a source of energy for heating or cooling or for direct conversion to electricity. Heating and cooling depend upon collection of rays of solar energy in a fluid heat transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossil fuels for energy generation.

One of the problems attending the development of an efficient system for the conversion of solar energy resides with the structure and design of the solar energy absorbing device, or solar collector. This solar collector generally comprises a rectangular plate-like structure possessing channels or passageways for the circulation of the energy absorbing fluid medium. Conventionally, these panels have comprised a pair of opposed expanded passageways, known as headers, which are placed at opposite ends of the panel, and are connected by a plurality of tubular passageways which are often in parallel relation with respect to each other. These passageways, as well as the headers themselves, have generally been disposed at right angles with respect to each other and in parallel relation with respect to the horizontal and vertical dimensions, respectively, of the panel.

The aforementioned configuration suffers from certain deficiencies, in that fluid flow tends to encounter pockets of stagnation which cut down on the efficient circulation of solar energy. Further, as a partial result of the turbulent operating conditions attending heat exchange applications, various entrained gases tend to collect in the passageways, with the result that air locks which greatly inhibit flow and reduce the maximum fluid circulation capacity of the panel are often formed. Such difficulties as reduced fluid velocity, nonuniform flow and excessive pressure drop have been characterized as resulting from the inefficiencies of such prior art designs. It is, therefore, toward the alleviation of the above difficulties that the present invention is directed.

SUMMARY OF THE INVENTION

In accordance with the present invention, a heat exchanger is provided which exhibits improved operating efficiency and particular utility in solar energy applications.

The panel of the present invention comprises a system of tubular passageways for a heat exchange medium defining at least two longitudinally extended headers extending substantially the length of the panel, a connecting header located at one end of the panel interconnecting the longitudinally extended headers and lying in a direction transverse thereto, generally transversely extending connecting portions of said passageways extending between the respective longitudinally extended headers, and entry and exit portions extending from at least two of said headers to provide ingress and egress openings for the heat exchange medium.

In a preferred embodiment the panel of the present invention comprises at least two longitudinally extended headers of essentially triangular shape, wherein a single, centrally located inlet header is located between a pair of laterally displaced opposed outlet headers, and said inlet and outlet headers are connected at one end thereof by a transversely extending, substantially rectangularly shaped connecting header, and entry and exit portions are respectively provided in extension from said inlet header and said connecting header to provide ingress and egress openings for said heat exchange medium.

The panel of the present invention may possess a wide variation in the configuration of the fluid distributing pattern to account for variations in size and utility of the particular panel to be prepared. Thus, the panel of the present invention may employ connecting portions disposed at an angle of at least 91° with respect to the longitudinal dimension of the panel to assist in fluid flow. Also, the headers of the present invention may be provided with bonded portions to assist in fluid distribution and to enhance structural stability and resistance to rupture under pressure.

As indicated above, the preferred embodiment of the present invention utilizes a metal panel having a system of internal fluid passageways, conventionally painted black, as will be described in more detail hereinbelow. The concepts of the present invention may, however, also be advantageously utilized in heat exchangers generally, such as, for example, using extrusions. Since the concepts of the present invention are particularly advantageous in metal panels having a system of internal fluid passageways, the present invention will be specifically described hereinbelow utilizing this type of system.

Accordingly, it is a principal object of the present invention to provide a metal panel for use in heat exchange applications which enables the efficient and economical transfer of heat energy.

It is a further object of the present invention to provide a metal panel as aforesaid which is particularly suited for use in a solar energy collector system.

It is yet a further object of the present invention to provide a metal panel as aforesaid which is capable of achieving uniform flow at high velocity of a heat exchange medium and a reduction in pressure drop within the passageways of a solar energy collector.

Further objects and advantages will become apparent to those skilled in the art as a detailed description proceeds with reference to the following drawings.

DETAILED DESCRIPTION

In accordance with the present invention, the foregoing objects and advantages are readily attained.

The panels of the present invention are provided with a system of parallel headers connected by foreshortened connecting portions which greatly facilitate flow efficiency and heat exchange.

As noted earlier, the present invention is directed to the problems of nonuniform flow at reduced velocity, and fluid blockage resulting from the turbulent conditions under which heat exchange panels are operating. Specifically, the panels are conventionally employed in either the horizontal or the vertical plane whereby fluid entering the panels is under pressure developed by a circulating pump or the like, and in the instance of vertical installation, additionally by the force of gravity. The fluid is split within the panel into a plurality of channels through which it passes to effect the heat exchange phenomenon. A problem which has arisen in this arrangement results from the turbulence of fluid movement through the panel which results in a pressure drop between the headers and the connecting portions thereof. This pressure drop causes air pockets to form and tends to impede the movement of fluid. This further results in a reduction in fluid flow and velocity which deleteriously affects the efficiency of the panel. The provision of a panel employing a plurality of longitudinally extended headers in combination with connecting passageways of reduced length in accordance with the present invention is believed to cure the aforenoted deficiencies.

Figure 1:
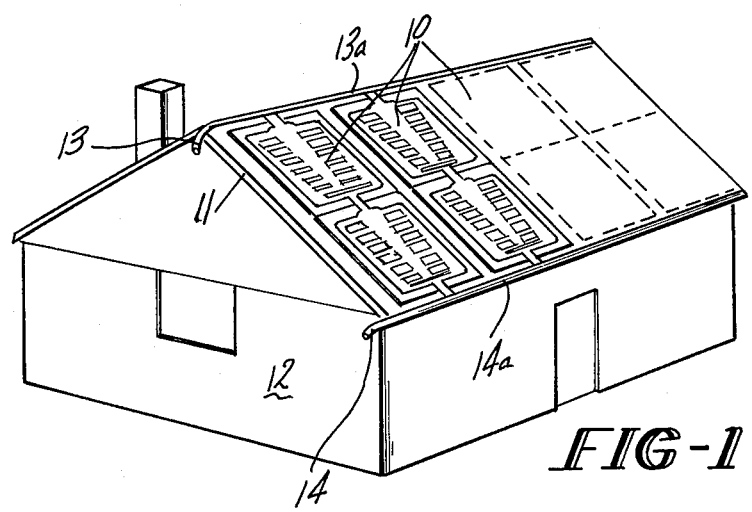
FIG. 1 is a diagram showing schematically the manner in which the panels of the present invention can be employed.

The panels of the present invention are preferably utilized in a solar heating system as shown in FIG. 1 wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows along common manifold 13a and is distributed into panels 10. The water flows through panels 10, is heated by means of solar energy, is collected in common manifold 14a and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity. The solar heating unit of the present invention may be used for residential heating purposes, such as in providing hot water in a residential environment. For example, three panels of the present invention having dimensions of 8 feet × 4 feet would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool cloudy days or at night when the heating of the fluid in the panel will not be of sufficient degree to provide the desired heat at the point of use.

A thermostat not shown in desirably installed at the top of the solar heater and this thermostat may be set to turn on a circulating pump whenever the temperature reaches a predetermined reading. The pump will then pump the water through the system as generally outlined above.

Figure 2:
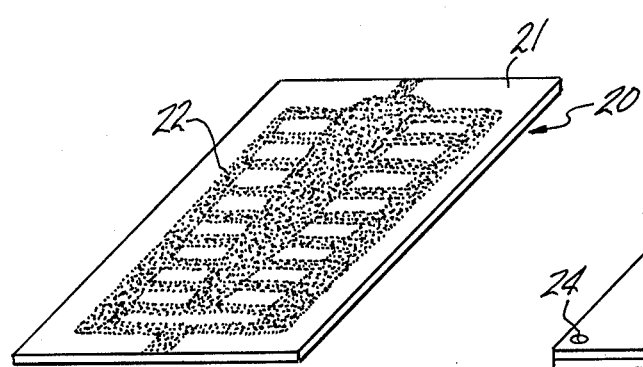
FIG. 2 is a perspective view of a sheet of metal having a pattern of weld-inhibiting material applied to a surface thereof.
Figure 3:
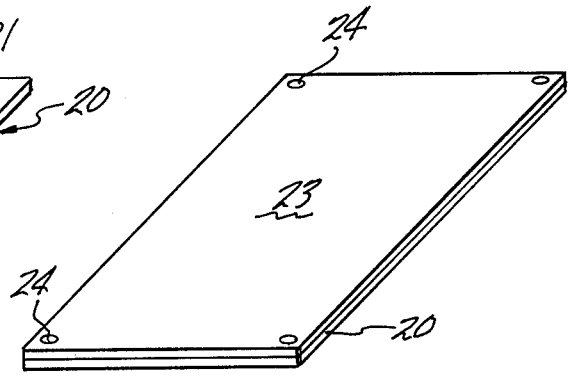
FIG. 3 is a perspective view of a composite metal blank wherein a second sheet of metal is superimposed on the sheet of metal shown in FIG. 2 with the pattern of weld-inhibiting material sandwiched therebetween.
Figure 4:
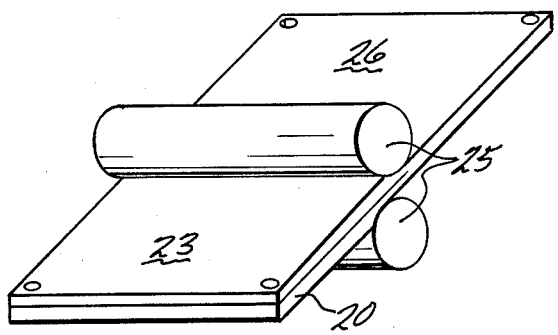
FIG. 4 is a schematic perspective view showing the sheets of FIG. 3 being welded together while passing through a pair of mill rolls.

As indicated above, the present invention contemplates a particularly preferred panel design for optimum efficiency in a solar heating system as described above. The metal panel or plate of the present invention is desirably fabricated by the ROLL-BOND ® process as shown in U.S. Pat. No. 2,690,002. FIG. 2 illustrates a single sheet of metal 20 as aluminum or copper or alloys thereof, having applied to a clean surface 21 thereof a pattern of weld-inhibiting material 22 corresponding to the ultimate desired passageway system. FIG. 3 shows the sheet 20 having superimposed thereon a second sheet 23 with a pattern of weld-inhibiting material 22 sandwiched between the units. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art.

Figure 5:
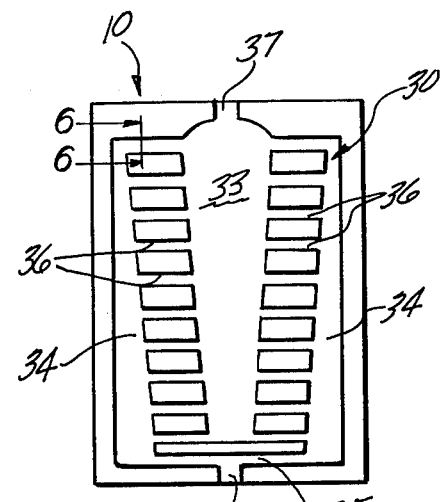
FIG. 5 is a top view showing the panel of the present invention having internal tubular passageways disposed between spaced apart portions of the thickness of the panel in the areas of the weld-inhibiting material.
Figure 7:
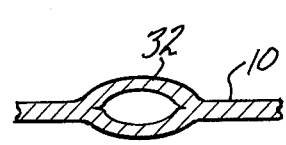
FIG. 7 is an alternate view showing a variation in the tube configuration similar to the view of FIG. 6.
Figure 6:
FIG. 6 is a sectional view taken along lines 6—6 of FIG. 5.

The resultant blank 26 is characterized by the sheets 20 and 23 being welded together except at the area of the weld-inhibiting material 22. The blank 26 with the unjoined inner portion corresponding to the pattern of weld-inhibiting material 22 may then be softened in any appropriate manner as by annealing, and thereafter the blank may be cold rolled to provide a more even thickness and again annealed. The portions of the panel adjacent the weld-inhibiting material 22 are then inflated by the introduction of fluid distending pressure, such as with air or water, in a manner known in the art to form a system of internal tubular passageways 30 corresponding to the pattern of weld-inhibiting material, as shown in FIG. 5. The passageways 30 extend internally within panel 10 and are disposed between spaced apart portions of the thickness of said panel. Thus, panel 10 comprises a hollow sheet metal panel or plate having a system of fluid passageways 30 for a heat exchange medium extending internally therein. If the passageways are inflated by the introduction of fluid distending pressure between flat die platens, the resultant passageways have a flat topped configuration 31 as shown in FIG. 6. If, on the other hand, passageways 30 are formed without the presence of superimposed platens, the resultant passageway configuration has a semicircular shape 32 as shown in FIG. 7.

As shown in FIG. 5, the passageways 30 include a plurality of headers comprising inlet header 33 and outlet headers 34, all of which are longitudinally extended to substantially the length of panel 10. At one end of panel 10, generally rectangular, transversely extending connecting header 35 is provided which links up headers 33 and 34. In addition, headers 33 and 34 are connected by connecting portions 36, comprising a plurality of relatively short tubular passageways extending in a direction substantially transverse to the longitudinally extended headers. Preferably, connecting portions 36 are provided as a plurality of spaced, parallel individual tubes running between header 33 and headers 34, which provide the optimum situs for the heating exchange phenomenon. Also, passageways 30 include entry portion 37 and exit portion 38 extending, respectively, and in opposite direction to each other, from inlet header 33 and connecting header 35, to provide ingress and egress openings for the heat exchange medium.

In accordance with the present invention as illustrated in FIG. 5, headers 33 and 34 are generally triangular in shape and are situated respecting each other whereby the inlet header 33 and the outlet headers 34 possess respective areas of the greatest width at opposite ends of panel 10. The relationship of the configurations of headers 33 and 34 has been found to enhance uniformity of fluid flow, as the differential in velocity of flow between the area of header 33 adjacent the entry portion and the area furthest therefrom is provided for by the reduction in header size at the furthest point. Likewise, the differential in flow experienced in outlet headers 34 is compensated for by the corresponding differential in header width as fluid builds up to exit the panel. The problem of pressure drop has been dealt with by the provision of connecting portions 36 which are foreshortened in relation to headers 33 and 34, as it is believed that the employment of said connecting portions in lengths exceeding those of the corresponding header structures contributed to a differential in fluid pressures. Thus, connecting portions 36, though not specifically limited to a particular dimension, are generally provided in lengths substantially less than that of the longitudinal dimensions of header structures 33 and 34. The residence time of fluid within connecting portions 36 is thus drastically reduced, and the opportunity for pressure drop to occur is correspondingly diminished. Fluid thus draining from headers 33 and 34 is able to flow evenly into connecting header 35 where it is transferred out of panel 10 through exit portion 38.

Figure 8:
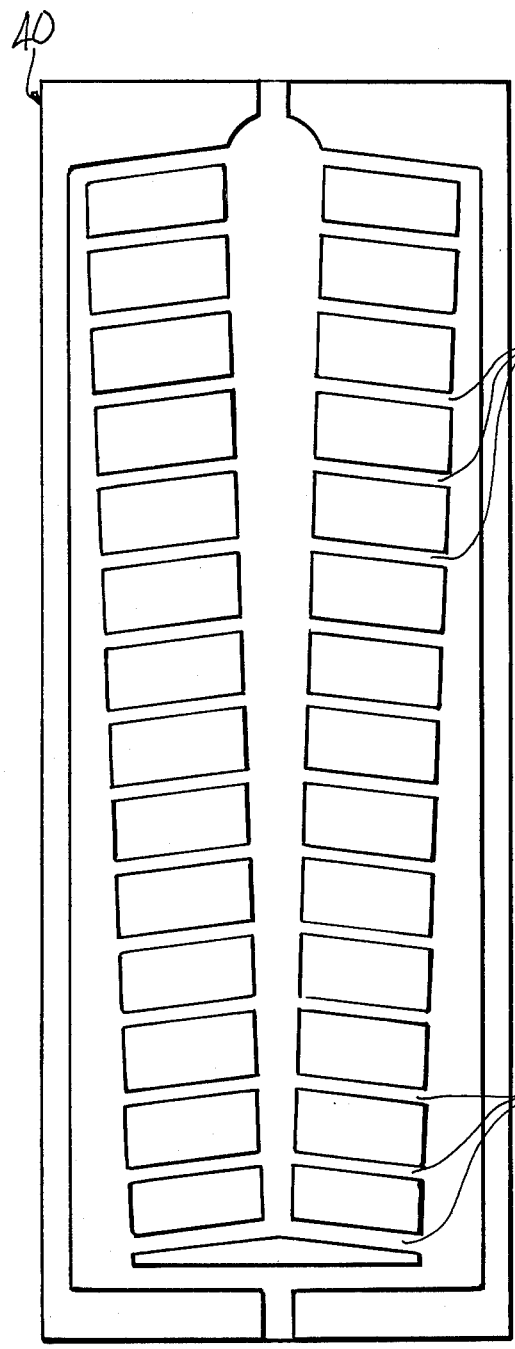
FIGS. 8, 9, 10 and 11 are top views showing alternate embodiments of the present invention.

As can be appreciated, the present invention is broadly applicable in a wide variety of designs embodying various modifications to suit the application of the panel. Thus, for example, FIG. 8 depicts a panel 40 which employs substantially the same arrangement of headers as set forth in FIG. 5, with the exception of the provision of connecting portions 41 in a direction slightly inclined toward the direction of fluid flow in the horizontal dimension of panel 40. Specifically, connecting portions 41 may be provided to define a angle of at least 91° as measured in the direction of fluid flow with respect to the longitudinal dimension of panel 40. The provision of slightly angled connecting portions 41 is in accordance with the disclosure of co-pending application Ser. No. 632,502, filed Nov. 17, 1975, by Charles A. Kleine and Verne L. Middleton, commonly assigned, the disclosure of which is incorporated herein by reference. Specifically and in accordance with said co-pending application, connecting portions 41 are inclined at an angle of at least 91°, and preferably 92° to 100°, measured with respect to the longitudinal dimension of the panel. Though this disposition of the connecting portions is illustrated herein, it is not obligatory and does not form a limitation on the scope of the present invention, as connecting portions may be employed at right angles to the longitudinal dimensions of the panel. The primary feature of the present invention is rather the disposition of the various header structures in the longitudinal dimension in association with the foreshortened connecting portions, as illustrated in FIG. 5, to improve fluid distribution and flow.

Figure 9:
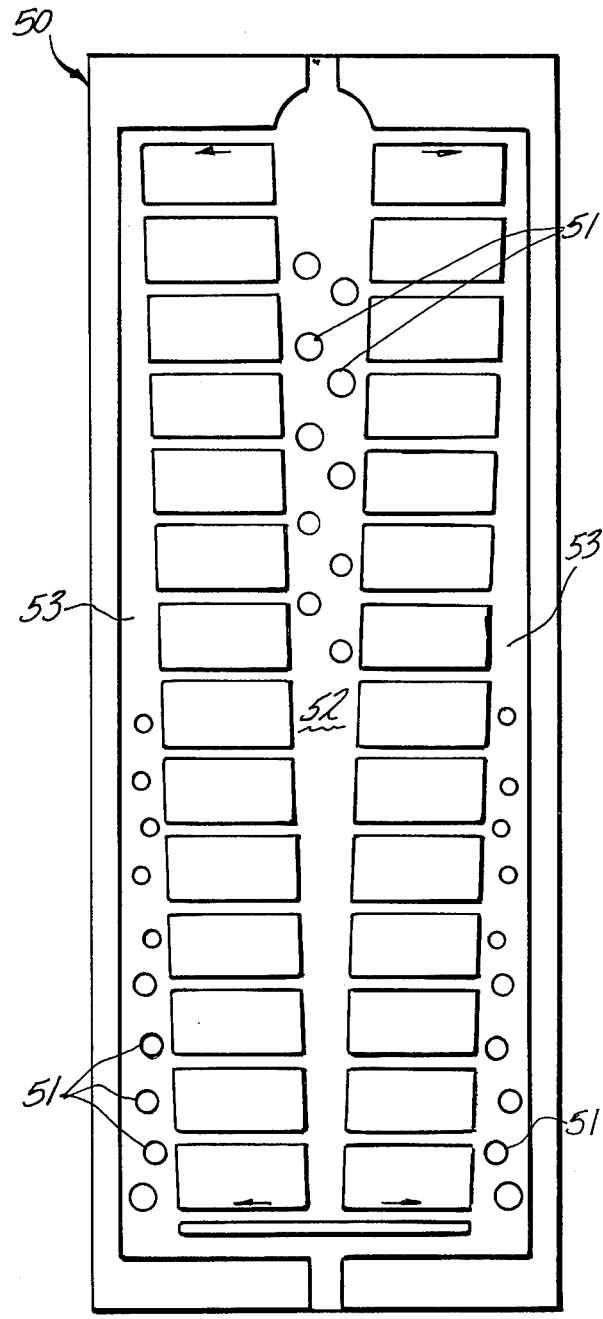

A further modification useful in accordance with the present invention is illustrated in FIG. 9. In this figure, panel 50 is provided which is substantially identical in configuration to panel 10 illustrated in FIG. 5, with the addition of a plurality of bonded portions 51 located intermittently in inlet header 52 and outlet headers 53. Bonded portions 51 are provided to assist in the interruption of fluid flow, which serves to reduce the deleterious effects of excess tubulence. Also, bonded portions 51 provide additional strength and structural integrity to headers 52 and 53 which increases their resistance to rupture under pressure during the employment of panel 50 in a heat exchange system. Though illustrated as essentially circular islands, bonded portions 51 may be provided in a wide variety of shapes, such as parallel elongated structures defining internal channels, not shown, which would further serve to assist in directing fluid flow within the headers. The foregoing is illustrative of a wide variety of modifications which can be made to the bonded portions 51 within the scope of the invention, and the invention should not be construed as limited thereby.

Figure 10:
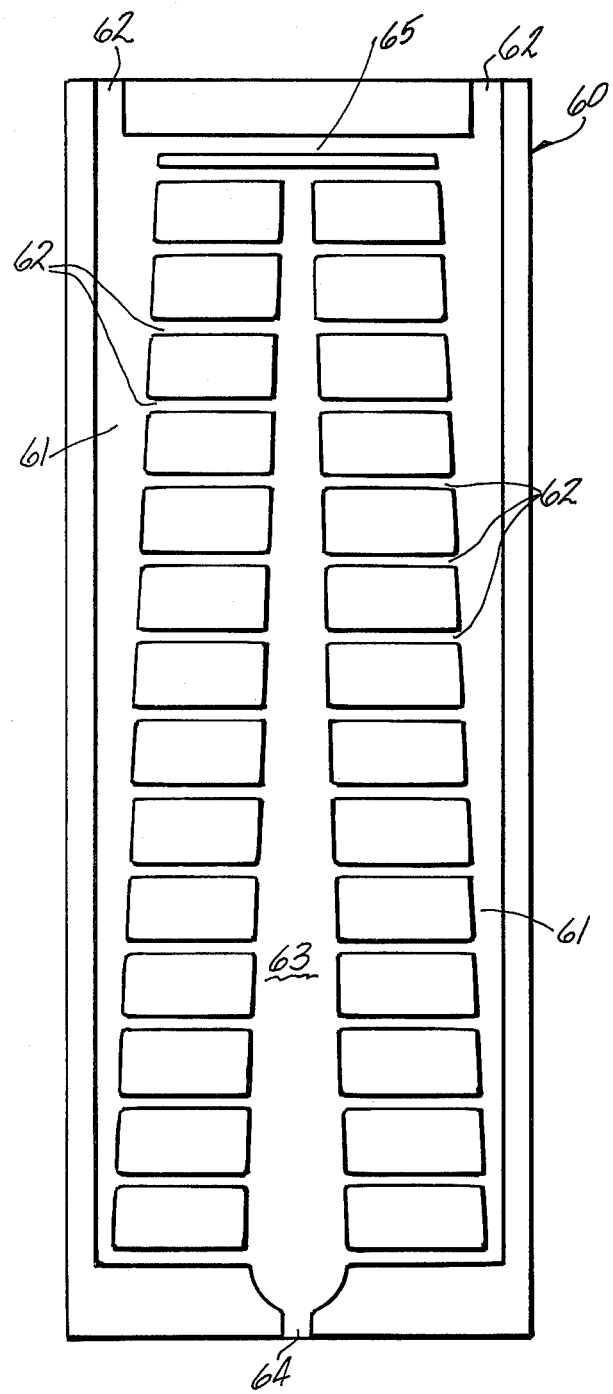

Referring now to FIG. 10, an alternate embodiment employing essentially the basic structure of the present invention is illustrated. Panel 60 can be seen to be of substantially identical configuration to that of panel 10 in FIG. 5, with the exception that two inlet headers 61, each possessing entry portions 62 are provided which correspond to outlet headers 34 of panel 10. Fluid thus may enter from two locations into headers 61 where it will pass through foreshortened connecting portions 62 to collect within centrally located outlet header 63. Outlet header 63 is identical in configuration to inlet header 33 shown in FIG. 5, and headers 61 and 63 are illustrated as of essentially triangular shape with their areas of greatest width located at opposite ends of panel 60. Fluid draining into outlet header 63 passes out of panel 60 through exit portion 64 corresponding to entry portion 37 in FIG. 5. As in FIG. 5, connecting header 65, corresponding to connecting header 35 is provided between headers 61 adjacent entry portions 62 and serves in this capacity to assure the equal distribution of flow of incoming heat exchange fluid, in the event, for example, the flow through one of ports 62 exceeds that of the other. Naturally, the panel of FIG. 10 may be modified by the provision of inclined connecting portions 62 and the inclusion within headers 61 and 63 of a plurality of bonded portions, as disclosed and discussed above with respect to FIGS. 8 and 9.

Figure 11:
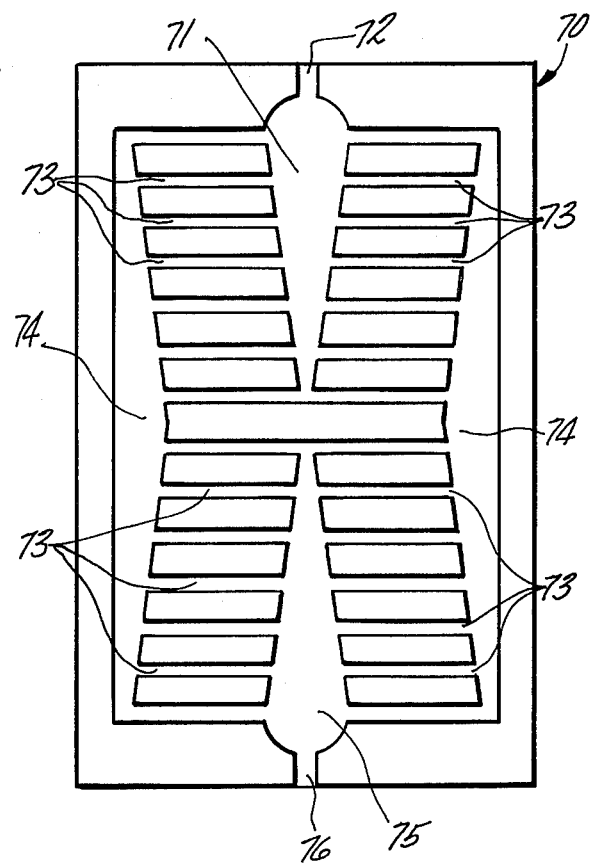

FIG. 11 illustrates an alternate embodiment of the present invention wherein the panel 70 comprises a fluid distribution pattern defined by the placement of the pattern of the present invention as illustrated in FIG. 5 in an abutting relationship to itself. Thus, panel 70 comprises a centrally located header 71 serving as the inlet header for heat exchange fluid which is substantially identical in displacement and configuration to header 33 of FIG. 5. Fluid entering header 71 through entry portion 72 is then directed through a plurality of bonded portions 73 which extend essentially transversely to communicate with lateral headers 74. Lateral headers 74 are likewise extensions of headers 34 by the provision of identical structures in abutment thereto. Headers 74, like header 71 are essentially triangular in shape, however, unlike header 71, possess their area of greatest width at a location approximately intermediate their length. Fluid collecting within headers 74 is then directed through connecting portions 73 which flow into central outlet header 75 bearing identical configuration to inlet header 71. Both headers 71 and 75 are identical in shape to header 33 in FIG. 5 and are thus essentially triangular structures. Fluid collecting in header 75 is then permitted to leave panel 70 through exit portion 76, which corresponds in configuration and size to entry portion 72. As can be seen from the Figure, the embodiment of panel 70 does not possess a transversely extending rectangular connecting header, as no utility for such a structure exists within the context of this panel configuration.

It should be noted that in all of the foregoing embodiments of the present invention, the connecting portions of the fluid passageways have been illustrated in parallel, spaced apart relationship to each other. This configuration is preferred but is not obligatory, as connecting portions may be employed which may vary somewhat in size, width, and direction which would be suitable for use in accordance with the present invention.

Though the foregoing description has set forth certain illustrative embodiments, many alternative panel designs may be envisioned by one skilled in the art in accordance with the concepts disclosed and described above, and the invention is accordingly considered to encompass all such modifications.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A heat exchange panel possessing a system of internal tubular passageways, said tubular passageways defining at least three generally tapered longitudinally extended headers, at least two of said longitudinally extended headers extending substantially the length of said panel, a connecting header located at one end of said panel transverse to and interconnecting longitudinally extended headers, and generally transversely extended connecting portions of said passageways, said connecting portions extending between longitudinally extended headers, and at least two fluid entry and exit portions longitudinally extending from at least two of said headers, wherein said longitudinally extended headers include a centrally located header offset by a pair of laterally displaced headers.

2. The panel of claim 1 wherein said connecting header is essentially rectangular in shape.

3. The panel of claim 1 wherein said longitudinally extended headers are generally tapered and comprise a single, centrally located inlet header flanked by a pair of laterally displaced, opposed outlet headers, said inlet header and said outlet headers possess their respective areas of greatest width at opposite ends of said panel, a single entry portion extending longitudinally away from said inlet header from the area of greatest width thereof, a generally rectangularly shaped connecting header located at the end of said panel furthest from said entry portion, and a single exit portion extending longitudinally away from said connecting header in the opposite direction to said entry portion.

4. The panel of claim 1 wherein said longitudinally extended headers are generally tapered and comprise a pair of laterally displaced, opposed inlet headers flanking a single, centrally located outlet header, said inlet headers and said outlet header possess their respective areas of greatest width at opposite ends of said panel, a pair of laterally opposed entry portions extending longitudinally away from said inlet headers from the areas of greatest width thereof, a generally rectangularly shaped connecting header located adjacent and between said entry portions, and a single exit portion extending longitudinally away from said outlet header in the opposite direction to said entry portions.

5. The panel of claim 1 wherein said longitudinally extended headers comprise a pair of opposed, laterally displaced lateral header structures, and a pair of longitudinally opposed, central header structures located therebetween, and entry and exit portions extending, respectively, from said central header portions in opposite directions away from each other.

6. The panel of claim 1 wherein the areas of greatest width of said headers are offset from each other so that the areas of greatest width of each of said headers are adjacent to the areas of least width of the other of said headers.

7. The panel of claim 1 wherein said panel is utilized in a solar energy collector system.

8. The panel of claim 1 wherein said longitudinally extended headers are provided with a plurality of bonded portions which provide interruption in the flow of said heat exchange medium and increase resistance to rupture under pressure.

9. The panel of claim 8 wherein said bonded portions comprise essentially circular islands.

10. The panel of claim 1 wherein said connecting portions comprise a plurality of spaced parallel individual tubular passageways.

11. The panel of claim 10 wherein said connecting portions are inclined with respect to the direction of fluid flow and are displaced at an angle of at least 91° with respect to the longitudinal dimension of said panel.

12. The panel of claim 11 wherein said connecting portions define an angle of from 92° to 100° with respect to said longitudinal dimension.

13. The panel of claim 1 wherein one of said headers is an inlet header and one of said headers is an outlet header, provided that said entry portion extends from said inlet header and said exit portion extends from said outlet header.

14. The panel of claim 13 wherein the area of greatest width of said inlet header is adjacent said entry portion.

15. The panel of claim 14 wherein the area of greatest width of said outlet header is adjacent said exit portion.

16. The panel of claim 1 including three of said tapered headers.

17. The panel of claim 16 wherein one of said headers is an inlet header and the other two of said headers are outlet headers.

18. The panel of claim 16 wherein two of said headers are inlet headers and the other of said headers is an outlet header.

* * * * *